Aug. 9, 1932.  R. J. BABCOCK  1,870,476
ROTARY COOKER
Filed Feb. 18, 1931
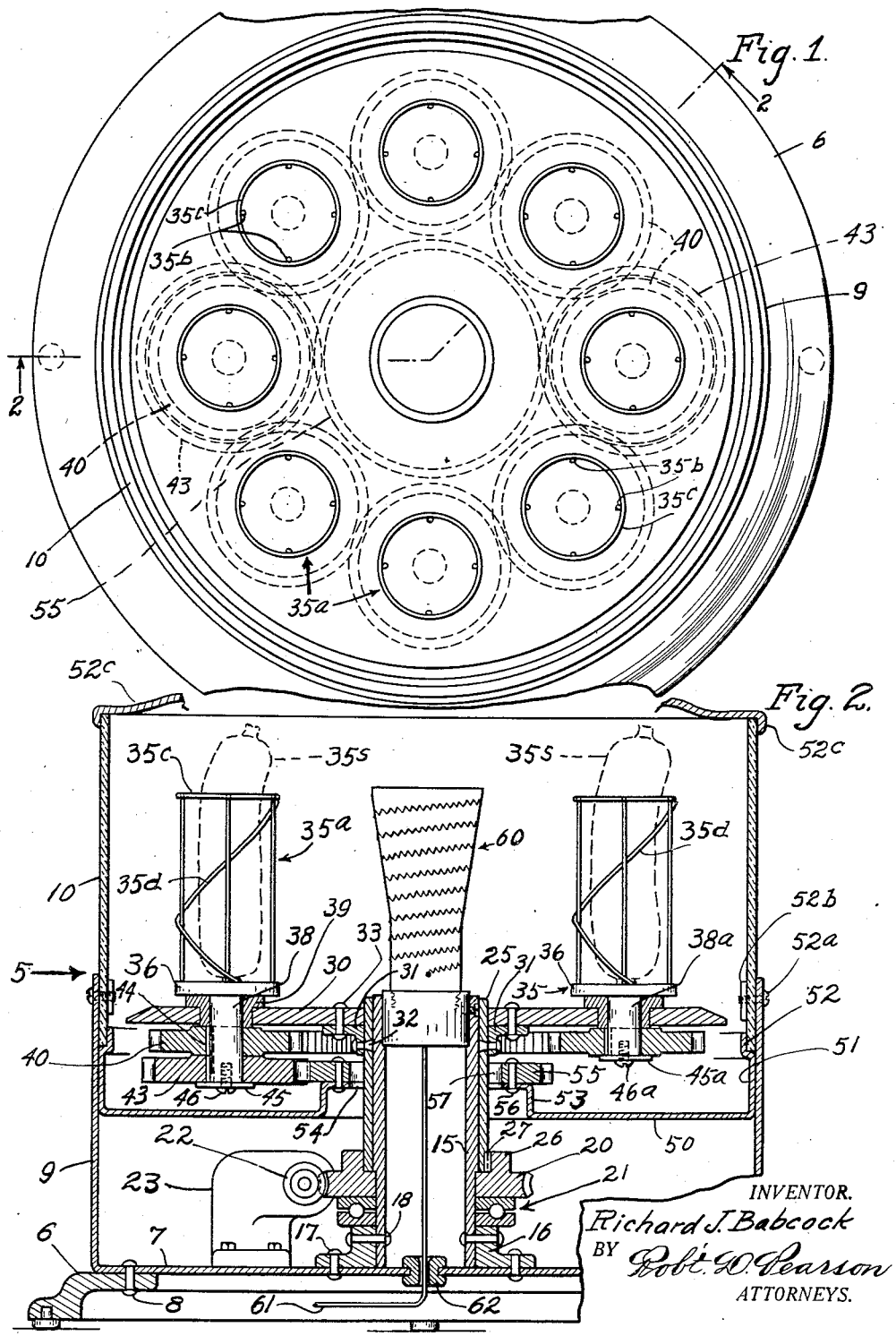
INVENTOR.
Richard J. Babcock
BY
Robt. W. Pearson
ATTORNEYS.

Patented Aug. 9, 1932

1,870,476

UNITED STATES PATENT OFFICE

RICHARD J. BABCOCK, OF LOS ANGELES, CALIFORNIA

ROTARY COOKER

Application filed February 18, 1931. Serial No. 516,728.

This invention relates to a broiling or baking device which may be used to cook a great variety of foods but which is more particularly adapted for broiling flesh foods such as sausages of the frankfurter type.

It is an object of the invention to provide a cooking device which will bake or broil uniformly the food articles cooked thereby, and which will at the same time apply the heat to the food being cooked in a more economical manner than has usually been possible heretofore.

More specifically it is an object of the invention to provide an improved rotary supporting means for a plurality of sausages or other articles of food being cooked thus supporting these articles in such a manner that they are individually rotated during the cooking operation thus exposing them on all sides to the heat of a centrally located heating device by which they are cooked.

Another object of the invention is to provide, in conjunction with other improved features, a broiling device which may readily be taken apart for cleaning purposes in order that grease or other food deposits may be cleansed away and the device thus be kept in a more sanitary condition and in a clean condition thereby preventing undesirable odors from being produced while the same is in use for cooking.

Other objects, advantages and features of invention may hereinafter appear.

Referring to the accompanying drawing which illustrates what is at present deemed to be a preferred embodiment of the invention, Fig. 1 is a plan view of the device.

Fig. 2 is a cross section on line 2—2 of Fig. 1, the cover being removed.

Referring in detail to the drawing, the housing 5 is desirably supported upon an annular base 6 to which its bottom 7 is secured in any suitable manner as by rivets 8. Said housing is preferably made of sheet metal and provided with a cylindrical upstanding wall 9 within the upper portion of which fits a cylindrical glass portion 10, means which will later be described being provided to support this glass member 10.

At the center of the bottom 7 is mounted an upstanding inner support, by preference and as shown, a sleeve 15 which is held in place by a collar 16 that surrounds the lower portion of said sleeve, said collar preferably being of an angular character as viewed in cross section. The base portion of said collar is secured to the bottom 7 by means of rivets 17 and the upstanding portion of said collar is secured to the sleeve 15 by means of rivets 18. Said collar 16 forms an outer support which surrounds the inner support 15. Upon said collar is rotatably mounted the master worm gear 20, said gear being supported by a roller bearing device 21 which is interposed between the top of the collar 16 and the lower face of said gear. Said gear 20 is driven by a worm pinion gear 22 which is driven by the motor 23.

Upon the upstanding sleeve 15 is also rotatably mounted the outer sleeve 25, the lower end of said sleeve 25 resting upon the master gear 20, said gear 20 having an upstanding annular flange 26 which fits around the lower end portion of said sleeve 25 and is keyed thereto by the key 27. To the upper end of the outer sleeve 25 is secured a rotary platform 30, in any suitable manner as by means of a collar 31 which is of an angular nature as viewed in cross section, the collar portion of said collar being secured to the sleeve 25 by means of rivets 32 and the upper portion of said collar underlying and being secured to the platform 30 by the rivets 33.

Upon the platform 30 is supported a plurality of food holders 35 which not only move with the platform but which are also provided with means to rotate them independently of said platform. For this purpose each food holder is provided with a base portion 36 which is furnished with a short downwardly extending shaft 38 or 38a, the upper portion of said shaft being surrounded by a bushing 39, a portion of said bushing being interposed between the platform 30 and said base 36, said bushing having a reduced central portion which extends through said platform 30 and projects slightly below the lower face thereof. To the shaft 38 or 38a of each food holder is splined a gear 40, all of said gears 4C being in mesh with each other as indicated by dotted lines in Fig. 1, so that the rotation of one of said gears will insure the rotation of them all.

To one or more of the shafts (to the two shafts lettered 38 in the drawing) are secured the driving gears 43 one of which is well shown in the left hand portion of Fig. 2, where a common spline 44 is shown securing the gears 40 and 43 to the shaft 38. The lower end of the shaft 38 is shown provided with a retaining washer 45 which is secured to said shaft by means of a screw 46 thus holding each food holder 35 snugly down in place while permitting it to rotate with respect to the platform 30 upon which it is mounted.

Like securing washers 45a and screws 46a are shown secured to the lower end of the shorter shafts 38a with which the greater number of the food carriers are provided.

Above the motor 23 and master gear 20 the housing 5 is provided with a false bottom 50 which has an upstanding parallel wall 51 fitted within the housing wall 9 and slightly contracted or inwardly offset at 52 near its upper side or edge in order to provide a shoulder whereon the glass portion 10 is supported.

The glass portion 10 of the housing is desirably secured to the housing part 9 within which it removably fits by means of screw bolts 52a the inner ends of which screw into washer nuts 52b. It is necessary to remove these bolts when the glass portion 10 is to be removed which is necessary before removing the food carriers as will later be described. The cover 52c may be provided to fit over the top of the glass housing section 10.

The central portion of the false bottom 50 is provided with a raised part 53 having therethrough a central aperture 54 which is preferably somewhat larger than the external diameter of the outer sleeve 25. Upon said raised part 53 is secured the main driving gear wheel 55 preferably by means of a series of rivets 56, this gear 55 having a large central aperture 57 which preferably coincides with the aperture 54 through the rise 53 of the false bottom 50.

From the construction which has been described it will be understood that when the motor 23 is put into operation, the rotation of the driving pinion 22 will rotate the master worm gear which will in turn rotate the sleeve 15 and 25 thereby rotating the platform 30. At the same time the two gears 43 which are secured to the lower end portions of the shafts 38, will be rotated by reason of meshing with the stationary gear 55. By this means the gears 40 which are splined to the shafts 38 will also be rotated and through them all the other gears 40 may be rotated, thus causing the food holders not only to travel in a parallel path but to rotate independently of the rotary platform 30 upon which they are mounted.

Each food holder 35 is shown having a wire frame or cage 35a mounted thereon in order to support the frankfurter sausages 35s in a position where the heat radiating has access to them. Said cages 35a are desirably formed of open wire as shown having the upright wire runs 35b, the lower ends of which are fixed in the base 36 and the upper ends of which are united to each other by the wire rings 35c. A spiral reinforcing wire 35d is preferably provided to strengthen each cage.

In order to provide a broiling heat for the sausages during the gyratory and rotary movements of the food holders, a central heating element 60 is provided, in the present instance an electric heating element, which is supported within the upper portion of the sleeve 25 and which is provided with electric current through the double conducting cord 61, said cord being shown led through an insulator 62 mounted in a central opening with which the bottom plate 7 is provided.

The false bottom 50 not only provides means for supporting the central gear 55 but also forms a drip pan which collects any oily substance which may fall thereinto from the sausages or other foods being cooked. The outer sleeve 25 fits loosely within the upstanding flange 26 of the gear 20 and may readily be withdrawn upwardly therefrom whenever it is desired to remove the platform 30 together with the parts attached thereto. This arrangement provides easy means of removing all the rotary parts of the appliance for the purpose of cleaning them, and as convenient replacing these parts after they have been cleaned.

It will be seen that the invention provides means for broiling the meat foods being cooked in a very efficient manner. The rotation of the platform causes a current of air to pass over the sausages and the independent rotation of each food holder causes all sides of the sausages to be successively presented to the heating of the central burner 60.

Claims:

1. In a cooker, a support, a master gear rotatably mounted upon said support, an upstanding sleeve about which said master gear rotates and upon which it has a working fit, said gear having an upstanding circular flange in outwardly spaced relation to said sleeve, an outer sleeve having a working fit around the first mentioned sleeve and having a slidable but non-rotatable fit within said flange of said gear, a platform fitted around and secured to said outer sleeve, food supports mounted upon said platform and rotatable therewith, and a central heating element to supply a cooking heat to food carried by said food supports, said platform together with the food supports mounted thereon and with said outer sleeve being vertically removable from said gear and being manually replaceable thereon.

2. In a cooker, a cylindrical housing having an upstanding side wall, an upstanding sleeve located centrally of said housing and secured to the bottom thereof, a master gear rotatably fitted around said sleeve, an outer sleeve having a working fit around the first mentioned sleeve and being splined to said master gear to rotate therewith, said housing having a combined false bottom and dripping pan located therein above said gear, said false bottom having a raised central portion provided with a central aperture surrounding said outer sleeve, a stationary gear mounted upon said raised central portion of said bottom, said stationary gear having an opening through which said outer sleeve extends, and food supporting means mounted upon said outer sleeve and rotatable therewith.

3. In a cooker, a lower housing member having an upstanding side wall, a false bottom member fitted within said lower housing member at a distance from the bottom thereof, said false bottom member having an upstanding part which fits within said lower housing member and which has an inwardly offset upper edge portion thus providing an annular seat, an upper housing section having a lower edge portion which removably fits within said seat, a rotary food support mounted above said false bottom, a heater mounted above said false bottom, and means mounted below said false bottom within the lower portion of said housing to rotate said rotary food support.

4. In a cooker, a housing, a floor within said housing, said floor having a raised central portion provided with an opening therethrough, an annular externally toothed gear surrounding said opening and secured to said raised portion, a standard projecting upwardly through said gear and opening, a heating element mounted upon said standard, a rotary platform surrounding said standard, means to rotate said platform, rotary food carriers mounted upon said platform, and gears operatively related to said food carriers and annular gear to cause the rotation of said platform to rotate said food carriers relatively thereto.

5. In a cooker, a support, a master gear rotatably mounted upon said support, an upstanding sleeve about which said master gear rotates and upon which it has a working fit, said gear having an upstanding circular flange in outwardly spaced relation to said sleeve, an outer sleeve having a working fit around the first mentioned sleeve and having a slidable but non-rotatable fit within said flange of said gear, food supporting means mounted upon said outer sleeve and rotatable therewith, means to supply a cooking heat to food carried by said food supporting means, said food supporting means together with said outer sleeve being vertically removable from said gear and being manually replaceable thereon.

6. In a cooker, a lower housing member having an upstanding side wall, a false bottom member within said lower housing member at a distance from the bottom thereof, said false bottom member having a peripheral portion which cooperates with said lower housing member to form a seat, an upper housing section adapted to fit removably within said seat, a rotary food support mounted above said false bottom, a heater mounted above said false bottom, and means mounted below said false bottom to rotate said food support.

7. In a cooker, a housing, a floor within said housing, said floor having a raised central portion provided with an opening therethrough, a wheel surrounding said opening and secured to said raised portion, a standard projecting upwardly through said wheel and opening, a heating element mounted upon said standard, a rotary platform surrounding said standard, means to rotate said platform, rotary food carriers mounted upon said platform, and means operatively related to said food carriers and wheel to cause the rotation of said platform to rotate said food carriers relatively thereto.

8. In a cooker, an outer support, a master gear rotatably mounted upon said support, an upstanding inner support about which said master gear rotates and upon which it has a working fit, said gear having an upstanding circular flange in outwardly spaced relation to said inner support, a sleeve having a working fit around said inner support and having a slidable but non-rotatable fit within said flange of said gear, food supporting means mounted upon said outer sleeve and rotatable therewith, and means to supply a cooking heat to food carried by said food supporting means, said food supporting means together with said sleeve being vertically removable from said gear and being manually replaceable thereon.

In testimony whereof I hereunto affix my signature.

RICHARD J. BABCOCK.